United States Patent
Muthers (10) Patent No.: US 9,933,279 B2
(45) Date of Patent: Apr. 3, 2018

(54) APPARATUS AND METHOD FOR CONTACTLESS MEASUREMENT OF AN ANGLE

(71) Applicant: Micronas GmbH, Freiburg (DE)

(72) Inventor: David Muthers, Denzlingen (DE)

(73) Assignee: TDK-MICRONAS GMBH, Freiburg (DE)

( * ) Notice: Subject to any disclaimer, the term of this patent is extended or adjusted under 35 U.S.C. 154(b) by 0 days.

(21) Appl. No.: 14/755,291

(22) Filed: Jun. 30, 2015

(65) Prior Publication Data

US 2016/0011010 A1  Jan. 14, 2016

(30) Foreign Application Priority Data

Jul. 10, 2014 (DE) .................. 10 2014 109 693

(51) Int. Cl.
| | |
|---|---|
| *G01B 7/14* | (2006.01) |
| *G01B 7/30* | (2006.01) |
| *G01R 33/06* | (2006.01) |
| *H01L 43/06* | (2006.01) |
| *G01D 5/14* | (2006.01) |

(52) U.S. Cl.
CPC .................. *G01D 5/145* (2013.01)

(58) Field of Classification Search
CPC .... G01D 5/145; G01D 5/2013; G01D 11/245; G01R 33/07; G01R 33/072; G01R 33/077; G01R 33/0052
USPC ............ 324/207.2, 174, 207.21, 207.25, 318
See application file for complete search history.

(56) References Cited

U.S. PATENT DOCUMENTS

| | | | | |
|---|---|---|---|---|
| 5,168,186 A | * | 12/1992 | Yashiro | F16C 17/107 |
| | | | | 310/156.28 |
| 5,861,745 A | * | 1/1999 | Herden | G01B 7/30 |
| | | | | 324/207.2 |
| 6,288,533 B1 | * | 9/2001 | Haeberli | A61K 48/00 |
| | | | | 324/207.25 |
| 6,433,536 B1 | | 8/2002 | Yundt et al. | |
| 6,577,121 B1 | * | 6/2003 | Adelerhof | G01D 5/145 |
| | | | | 324/207.21 |

(Continued)

FOREIGN PATENT DOCUMENTS

| | | |
|---|---|---|
| DE | 10 2007 026 220 A1 | 12/2008 |
| DE | 10 2007 036 984 A1 | 8/2009 |

(Continued)

OTHER PUBLICATIONS

Reymond et al., "True 2D CMOS integrated Hall sensor," IEEE Sensors 2007 Conference pp. 860-863 (2007).

(Continued)

*Primary Examiner* — Giovanni Astacio-Oquendo
(74) *Attorney, Agent, or Firm* — 24IP Law Group; Timothy R DeWitt (57) ABSTRACT

An apparatus 10 for the contactless measurement of a rotation angle 15 is described. A permanent magnet 60 having a number of poles, wherein the number of poles amounts to four or more and cannot be divided by three, is mounted on the front of an axle. In a plane below the permanent magnet 16 at least three first lateral Hall sensors 40a-c are located in a circular path 50. A method for calculation the rotation angle 15 with the aid of the lateral Hall sensors 40a-40c is also described.

8 Claims, 5 Drawing Sheets

(56) References Cited

U.S. PATENT DOCUMENTS

| | | | |
|---|---|---|---|
| 7,317,313 B2* | 1/2008 | Carlson | G01D 11/24 |
| | | | 324/207.25 |
| 7,548,060 B2* | 6/2009 | Herrmann | G01D 5/147 |
| | | | 324/207.21 |
| 7,710,110 B2* | 5/2010 | Patil | G01D 5/145 |
| | | | 324/174 |
| 8,368,393 B2 | 2/2013 | Zangl et al. | |
| 8,736,258 B2 | 5/2014 | Trontelj | |
| 2002/0021124 A1 | 2/2002 | Schott et al. | |
| 2004/0222795 A1* | 11/2004 | Dietz | G01R 33/385 |
| | | | 324/318 |
| 2004/0236500 A1* | 11/2004 | Choi | G01C 21/16 |
| | | | 701/500 |
| 2007/0044548 A1* | 3/2007 | Ishizuka | F02D 41/009 |
| | | | 73/114.26 |
| 2008/0284421 A1* | 11/2008 | Hatanaka | G01D 5/04 |
| | | | 324/207.25 |
| 2010/0026282 A1* | 2/2010 | Kaita | G01B 7/30 |
| | | | 324/207.25 |
| 2010/0321008 A1* | 12/2010 | Mita | G01D 5/145 |
| | | | 324/207.25 |

FOREIGN PATENT DOCUMENTS

| | | |
|---|---|---|
| EP | 1 182 461 A2 | 2/2002 |
| EP | 0916074 | 7/2003 |
| EP | 2149797 | 8/2008 |

OTHER PUBLICATIONS

Metz et al., "Contactless Angle Measurement Using Four Hall Devices on Single Chip," Transducers '97, 1997 International Conference on Solid-State Sensors and Actuators, Chicago. Jun. 16-19, 1997, pp. 385-388.

* cited by examiner

APPARATUS AND METHOD FOR CONTACTLESS MEASUREMENT OF AN ANGLE

CROSS-REFERENCE TO RELATED APPLICATION

The application claims priority to and benefit of German Patent Application No. 10 2014 109 693.2 entitled "Vorrichtung and Verfahren zur beruhrungslosen Messung eines Winkels" filed on 10 Jul. 2014. The entire contents of this application are incorporated herein by reference.

BACKGROUND OF THE INVENTION

Field of the Invention

The invention relates to an apparatus and a method for the contactless measurement of a rotation angle.

Brief Description of the Related Art

The contactless measurement of a rotation angle with the aid of the Hall effect is known. For example, from the publication by Reymond, S. et al., "True 2-D CMOS Integrated Hall Sensor", IEEE SENSORS 2007 Conference, pages 860-863, an apparatus is known for the contactless measurement of a rotation angle, having a semiconductor substrate wherein as magnetic field sensors 64 so-called vertical Hall sensors are integrated. The magnetic field sensors in this publication are arranged at equal mutual intervals on a circular path disposed in the chip plane of the semiconductor substrate. The vertical planes where the magnetic field sensors extend are arranged respectively radially to a notional center axis extending through the center of circle of the circular path and being arranged orthogonally to the chip plane. The magnetic field sensors are so connected to a scanning device that measuring signals of the individual magnetic field sensors are connectible consecutively to a differential output connector for a rotation scanning signal. The values of the magnetic field sensors accordingly are read out in cyclically rotating fashion.

European patent no. EP 2 149 797 (Micronas GmbH) discloses an apparatus for measuring an angle wherein a magnetic field is arranged in a plane. The apparatus has at least two magnetic field sensors that are arranged with their measurement axes in and/or parallel to the plane and are oriented mutually transversally.

Metz et al. also describe the contactless measurement of a rotation angle in the publication "Contactless Angle Measurement using Four Hall Devices on Single Chip", Transducers, 1997 International Conference on Solid-State Sensors and Actuators, Chicago, 16-19 Jun. 1997. This publication shows four lateral Hall sensors arranged at equal mutual intervals on a circular path disposed in the chip plane of the semiconductor substrate. A permanent magnet having two poles is attached at the end of a rotating axle and generates a magnetic field in the Hall sensors. The same apparatus is described in the European Patent No. EP-B-0 916 074.

The known apparatus have in common that a permanent magnet is mounted on a rotatable element and generates a magnetic field that is captured by the Hall sensor. A problem in such apparatus are magnetic interference fields in the surroundings of the Hall sensor. A signal processing processor needs to effect a compensation of the measuring values received from the Hall sensor, in order to compensate these magnetic interference fields. This compensation is possible in a relatively simple fashion for a homogeneous background field. The compensation for a magnetic field that is generated by current in an adjacent conductor is more extensive, since the compensation also has to consider the field gradient of the generated magnetic field.

Modern cars have numerous current-carrying conductors causing such magnetic fields. A complete shielding of these magnetic interference fields in the vicinity of a rotation-angle measurement device is impossible.

SUMMARY OF THE INVENTION

An apparatus for the contactless measurement of a rotation angle, which uses a new procedure in the compensation of the magnetic interference fields is disclosed in this description. The apparatus comprises a permanent magnet having an even number of poles and at least three first lateral Hall sensors arranged in a plane below the permanent magnet. The permanent magnet in one aspect of the invention has a number of poles, wherein the number of the poles amounts to four or more and cannot be divided by three. The permanent magnet rotates in a rotation axis, wherein the direction of the rotation axis extends through the center of the circle of the circular path and is arranged substantially orthogonally to the plane.

This apparatus makes possible a measurement of the angle with a high signal-noise ratio, simple digital processing of the measuring signals from the Hall sensors and substantial elimination of any inaccuracies in the calculation due to the magnetic interference fields.

In a further aspect of the invention, the at least three first lateral Hall sensors are arranged substantially at equal angles in the circular path. The apparatus is thus of a symmetrical design, and the processing of the measuring signals received from the Hall sensors is facilitated. In a further aspect of the invention, at least two second lateral Hall sensors are arranged opposite two corresponding ones of the first lateral Hall sensors in the circular path. Using the opposing Hall sensors it is now possible to calculate the field gradients of the magnetic interference fields and largely eliminate the field gradients in order to improve the precision of the measurement of the rotation angle.

A method for the contactless measurement of a rotation angle is also disclosed. The method comprises:
- generating with the permanent magnet a magnetic field below the rotation angle to be measured;
- measuring the signal values in at least three first lateral Hall sensors; and
- calculating the rotation angle.

The measurements can be executed three times if the three first lateral Hall sensors are arranged equiangularly. The signal values are subsequently calculated by determining an average value of all three measurements.

The method makes possible a precise measurement of the angle by considering interfering factors, such as but not limited to homogeneous background fields and field gradients due to current-carrying conductors.

For a better understanding of the invention, a number of exemplary embodiments will be explained by means of the following figures. The invention is not limited to these exemplary embodiments, and aspects of one embodiment can be combined with aspects of a further embodiment.

BRIEF DESCRIPTION OF THE DRAWINGS

For a more complete understanding of the present invention and the advantages thereof, reference is now made to the following description and the accompanying drawings, in which.

DETAILED DESCRIPTION OF THE INVENTION

Figure 1:
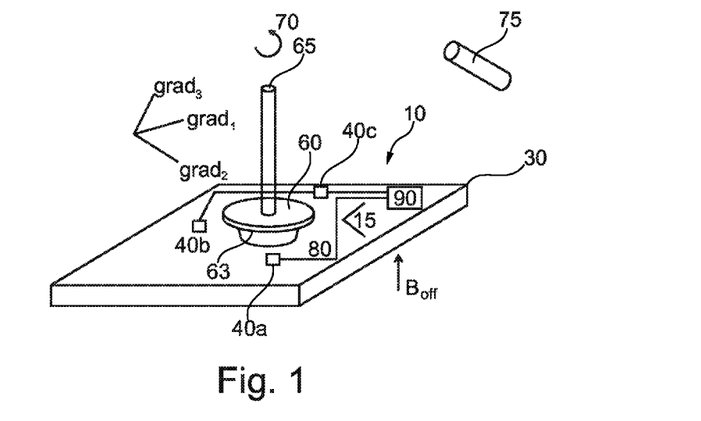
FIG. 1 shows an overview figure of the apparatus.

FIG. 1 shows an overview of an apparatus 10 in a first aspect. The apparatus 10 has a permanent magnet 60 attached to a front 63 of an axle 65. The axle 65 rotates about a rotation axis 70 and the apparatus 10 can measure a rotation angle 15 of the axle 65.

Figure 2:
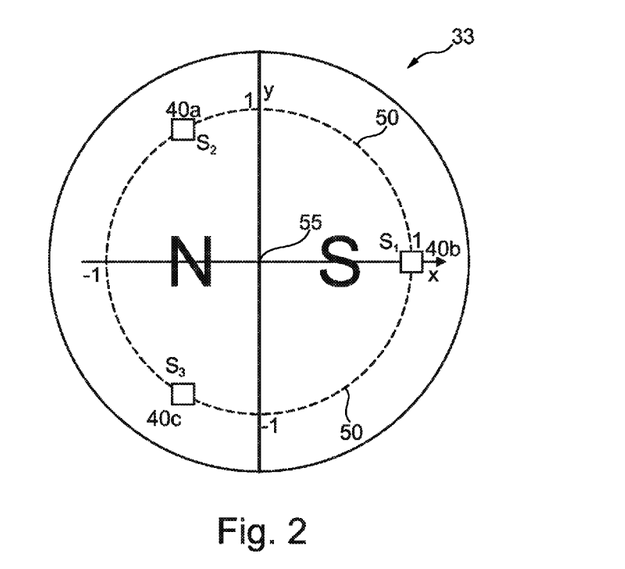
FIG. 2 shows an arrangement of the first lateral Hall sensors.

Three first lateral Hall sensors 40a-40c are attached in a circular path 50 on a semiconductor substrate 35. These three lateral Hall sensors 40a-c are depicted in FIG. 2 in the circular path 50. This circular path 50 is disposed in a chip plane 30 below the plane of the permanent magnet 60. The rotation axis 70 of the axle 65 extends through the center of the circle 55 of the circular path 50 and is arranged substantially orthogonally to the chip plane 30 and consequently also orthogonally to the surface of the semiconductor substrate 35. The first lateral Hall sensors 40a-40c are connected to a signal processor 90 via lines 80. The signal processor 90 can receive measured values S1, S2, S3 from the Hall sensors 40a-40c and calculate the value of the rotation angle 15 from the received measured values S1, S2 and S3.

FIG. 1 also shows a current-carrying interfering conductor 75 in the vicinity of the apparatus 10. This interfering conductor 75 causes an interference field $B_{st}$ with gradients in three directions grad1, grad2, grad3. The person skilled in the art will understand that the interfering conductor 80 is merely an example for several interfering conductors in the vicinity of the apparatus 10. The apparatus 10 is disposed in a homogeneous background magnetic field designated by $B_{off}$.

FIG. 2 shows a plan view of the three lateral Hall sensors 40a-c, which are arranged substantially at equal angles around the circular path 50. The permanent magnet 60 in this figure is bipolar, with a north pole N on the left side of the figure and a south pole S on the right side of the figure, wherein this arrangement does not limit the invention. The permanent magnet 60 has a magnetic measuring angle 15 $\Phi$ and a flux density $B_0$. The three lateral Hall sensors 40a-c generate each one measuring signal S1, S2 and S3, which are phase-shifted by $\pm 2\pi/3$ due to the respective angular displacement. The voltages in the respective lateral Hall cells $V_{S1}$, $V_{S2}$ and $V_{S3}$ are therefore calculated in accordance with the following equation:

$$V_{S1} = B_o \cos(\varphi)$$

$$V_{S2} = B_o \cos\left(\varphi + \frac{2\pi}{3}\right)$$

-continued $$V_{S3} = B_o \cos\left(\varphi - \frac{2\pi}{3}\right)$$

Figure 3:
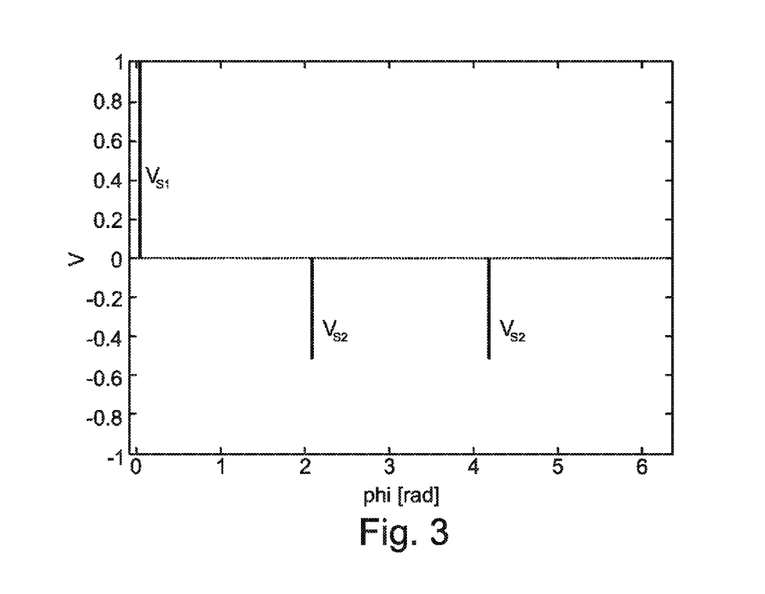
FIG. 3 illustrates measuring signals of the three first lateral Hall sensors.

FIG. 3 shows the measuring signals $V_{S1}$, $V_{S2}$ and $V_{S3}$ for the magnetic angle $\varphi=0$. The equation of the measuring angle $\varphi$ from the values of the measuring signals $V_{S1}$, $V_{S2}$ and $V_{S3}$ is therefore:

$$\varphi = \mathrm{atan}\left(\frac{\sqrt{3} V_{S1}}{V_{S3} - V_{S2}}\right)$$

The weighting of the measuring value $V_{S1}$ is too high in the equation. The measuring angle $\varphi$ is therefore preferably calculated three times from all three measuring values $V_{S1}$, $V_{S2}$ and $V_{S3}$, and afterwards an average value is determined from the three calculated magnetic angles.

The homogeneous background field $B_{off}$ is the average value of all three measuring signals $V_{S1}$, $V_{S2}$, $V_{S3}$ and is calculated as follows:

$$\tfrac{1}{3}(V_{S1}+V_{S2}+V_{S3})=b_{off}$$

In a further aspect of the apparatus, the differential values $V_{S12}$, $V_{S23}$ and $V_{S31}$ of the measuring signals can be used instead of the absolute values $V_{S1}$, $V_{S2}$ and $V_{S3}$ of the measuring signals.

$$V_{S12}=V_{S1}-V_{S2}$$

$$V_{S23}=V_{32}-V_{S3}$$

$$V_{S31}=V_{S3}-V_{S1}$$

These values $V_{S12}$, $V_{S23}$, $V_{S31}$ are phase-shifted by respectively $\pm 2\pi/3$ in order to calculate the measuring angle $\varphi$. The value of the homogeneous background field $B_{off}$ is consequently eliminated from these equations with the differential values.

The apparatus 10 of FIG. 1 effectively measures and eliminates the value of the homogeneous background field $B_{off}$. When there are field gradients due to the interfering conductor 80, there are still some inaccuracies present, however.

The measurement of a magnetic field at a distance from the rotation axis or center of the circle 55 leads to harmonic distortions in the measuring signals S1, S2 and S3, since the measuring signals S1, S2 and S3 tend to take on a triangular form. For this reason, odd harmonics are present in the measuring signal. The strongest harmonic is an oscillation of the third order. The largely equiangular displacement of the first lateral Hall sensors 40a-c in the circular path 55 with an angular distance of $\pm 2\pi/3$ around the circular path largely eliminates these interferences, since the period of $\pm 2\pi/3$ of the interferences corresponds to the phase shift between the measuring signals S1, S2 and S3, as can be identified in FIG. 4.

Figure 4:
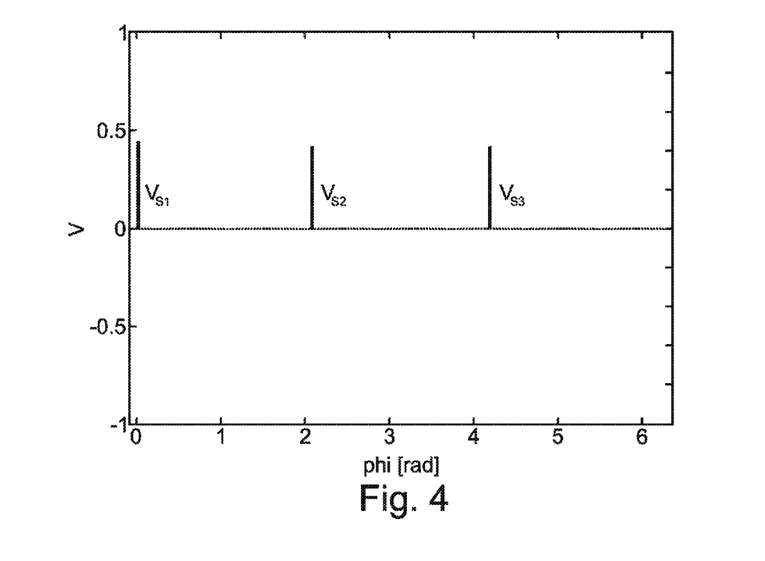
FIG. 4 shows harmonic oscillations of the third order.

FIG. 4 shows that the third order harmonics have the same amplitude in each of the first lateral Hall sensors 40a-40c. In other words, these third order harmonics are equivalent to a constant background signal that can be eliminated. By calculation of the difference of the sensor signals by the processor 90, interferences due to the third order harmonics are effectively suppressed.

Figure 5:
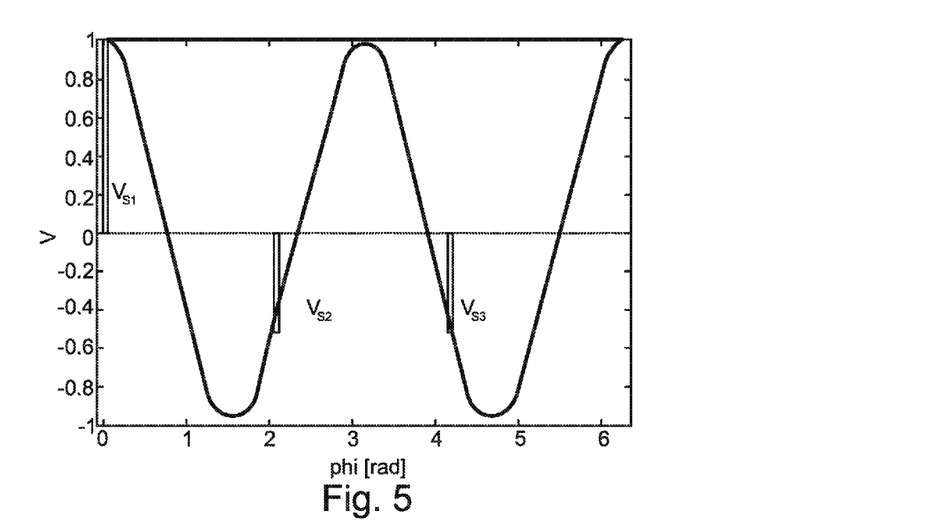
FIG. 5 illustrates measuring signals of the three first lateral Hall sensors with four-pole magnets.

Permanent magnets 60 having more than four poles can also be used with the three first lateral Hall sensors 40a-40c, as long as the number of poles cannot be divided by 3. In other words, the permanent magnet 60 can have four or eight poles. A higher number of poles is possible in theory, but is not preferred for reasons of economy. FIG. 5 shows the measuring signals $V_{S1}$, $V_{S2}$ and $V_{S3}$ for the case of a permanent magnet 60 having four poles at φ=0. In the embodiment of FIG. 5, the magnetic field $B_0$ has two periods per rotation. The measuring signals $V_{S1}$, $V_{S2}$ and $V_{S3}$ are accordingly shifted by ±4π/3 phases. The phase shift corresponds to an angular displacement of ±4π/3. Consequently, the rotation direction appears to be inverted in comparison to the bipolar permanent magnet 60. Of course, the measuring signals $V_{S1}$, $V_{S2}$, $V_{S3}$ are repeated after a half rotation, which limits the measuring range to 0 to π. The error in the angle measurement due to irregularities in the lateral Hall sensors 40a-c is reduced by a factor of two in this aspect.

The use of the three first lateral Hall sensors 40a-c leads to a high degree of precision in the angular measurement due to the high signal-noise ratio through the first lateral Hall sensors 40a-c. The apparatus 10 of FIG. 2 is easier to calibrate and makes it possible to suppress the harmonic oscillations of the third order and to eliminate the influences of homogeneous background fields.

Figure 6:
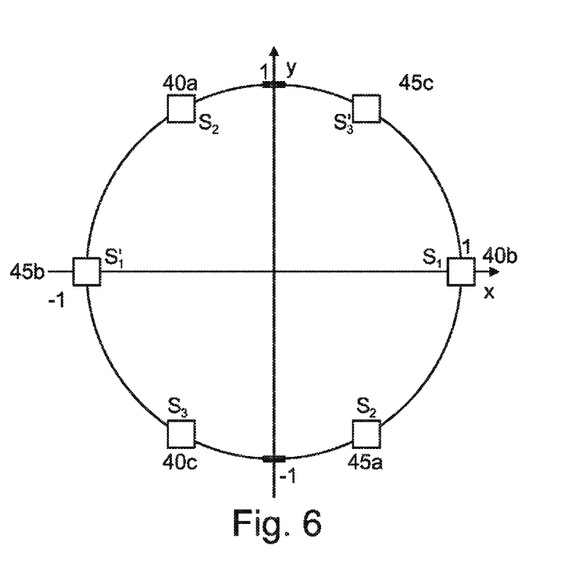
FIG. 6 shows an arrangement of six lateral Hall sensors.

A second aspect of the invention is shown in FIG. 6. The apparatus of FIG. 6 shows the circular path 50 with the three first lateral Hall sensors 40a-c and additionally three second lateral Hall sensors 45a-c, which are arranged on the circular path 50 opposite the corresponding ones of the first lateral Hall sensors 40a-c. These second lateral hall sensors 45a-c enable the calculation of a field gradient in a magnetic interference field of the interfering conductor 75, since the field of the interfering conductor 75 is identical in the opposite positions of the respective first lateral Hall sensors 40a-c and second lateral Hall sensors 45a-c. For this reason, differences are caused in the measuring of the magnetic field by the unwanted interference field. These differences can be ascertained and deducted from the measuring signals $V_{S1}$, $V_{S2}$ and $V_{S3}$.

The correction factor for the field gradient of the interfering field can be calculated as follows. The position vectors of the first lateral Hall sensors 40a-c (and of the second lateral Hall sensors are calculated as follows:

$$\vec{S_1} = (1, 0)$$

$$\vec{S_2} = \left(-\frac{1}{2}, \frac{\sqrt{3}}{2}\right)$$

$$\vec{S_3} = \left(-\frac{1}{2}, -\frac{\sqrt{3}}{2}\right)$$

$$\vec{S_3} = \left(-\frac{1}{2}, -\frac{\sqrt{3}}{2}\right)$$

$$\vec{S_1'} = (1, 0) = -\vec{S_1}$$

$$\vec{S_2'} = \left(\frac{1}{2}, -\frac{\sqrt{3}}{2}\right) = -\vec{S_2}$$

$$\vec{S_3'} = \left(\frac{1}{2}, \frac{\sqrt{3}}{2}\right) = -\vec{S_3}$$

The corresponding measuring signal $S_i$ at the Hall sensor i is the scalar product of the sensor vector and the magnet vector with the gradient vector together with the homogeneous background field:

$$V_{Si} = \vec{S_i} \cdot (\vec{B_2} + \vec{\text{grad}}) + B_{off}$$

Consequently, the measuring signals $V_{S1}$, $V_{S2}$ and $V_{S3}$ are calculated for the corresponding first lateral Hall sensors 40a-c and the second lateral Hall sensors 45a-c as follows:

$$V_{S1} = B_0 \cos(2\phi) + B_{off} + \text{grad}_x$$

$$V_{S2} = B_0 \cos\left(2\left(\phi - \frac{2\pi}{3}\right)\right) + B_{off} - 0.5\,\text{grad}_x + \frac{\sqrt{3}}{2}\text{grad}_y$$

$$V_{S3} = B_0 \cos\left(2\left(\phi + \frac{2\pi}{3}\right)\right) + B_{off} - 0.5\,\text{grad}_x - \frac{\sqrt{3}}{2}\text{grad}_y$$

$$V_{S'1} = B_0 \cos(2\phi) + B_{off} - \text{grad}_x$$

$$V_{S'2} = B_0 \cos\left(2\left(\phi - \frac{2\pi}{3}\right)\right) + B_{off} - 0.5\,\text{grad}_x - \frac{\sqrt{3}}{2}\text{grad}_y$$

$$V_{S'3} = B_0 \cos\left(2\left(\phi + \frac{2\pi}{3}\right)\right) + B_{off} + 0.5\,\text{grad}_x + \frac{\sqrt{3}}{2}\text{grad}_y$$

The homogeneous background field $B_{off}$ has the following value:

$$B_{off} = \frac{1}{3}(V_{S1} + V_{S2} + V_{S3})$$

The field gradients along the axes 40a-45a, 40b-45b and 40c-45c are calculated as follows:

$$\text{grad}_1 = \frac{1}{2}(V_1 - V_{S'1}) = \text{grad}_x$$

$$\text{grad}_2 = \frac{1}{2}(V_2 - V_{S'2}) = \text{grad}_x$$

$$\text{grad}_3 = \frac{1}{2}(V_3 - V_{S'3}) = \text{grad}_x$$

The corrected values for the measuring signals $V_{S1}$ are calculated as follows:

$$V_{S1,corr} = V_{S1} - B_{off} - \text{grad}_1 = B_0 \cos(2\phi_1)$$

$$V_{S2,corr} = V_{S2} - B_{off} - \text{grad}_2 = B_0 \cos\left(2\left(\phi_2 - \frac{2\pi}{3}\right)\right)$$

$$V_{S3,corr} = V_{S3} - B_{off} - \text{grad}_3 = B_0 \cos\left(2\left(\phi_3 + \frac{2\pi}{3}\right)\right)$$

These three equations can be solved for the calculated of the angle value and deliver three estimated values of the angle value $\Phi_1$, $\Phi_2$, and $\Phi_3$. The angle value is then determined e.g. by averaging:

$$\phi_1 = \text{atan}\left(\frac{\sqrt{3}\,V_{S1,corr}}{V_{S3,corr} - V_{S2,corr}}\right)$$

$$\phi_2 = \text{atan}\left(\frac{\sqrt{3}\,V_{S2,corr}}{V_{S1,corr} - V_{S3,corr}}\right) + \frac{2\pi}{3}$$

$$\phi_3 = \text{atan}\left(\frac{\sqrt{3}\,V_{S3,corr}}{V_{S2,corr} - V_{S1,corr}}\right) - \frac{2\pi}{3}$$

Figure 7:
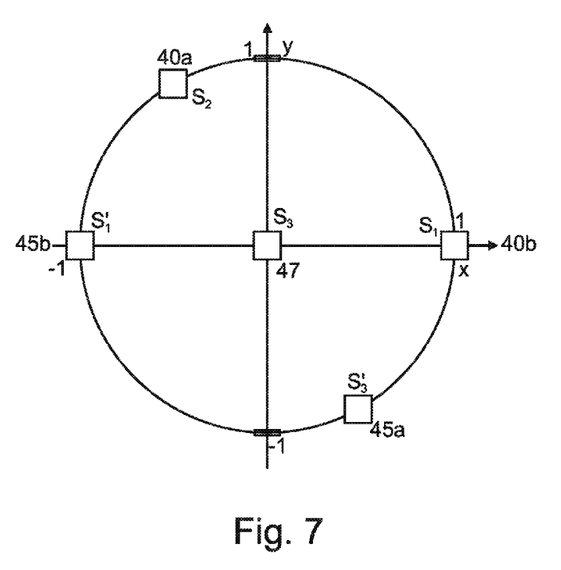
FIG. 7 shows an arrangement of five lateral Hall sensors.

A third aspect of the invention is represented in FIG. 7. The apparatus of FIG. 7 shows two of the first lateral Hall sensors 40a and 40c, as well as two opposite second lateral Hall sensors 45a and 45c on the circular path 50. A third lateral Hall sensor 47 is arranged in the center of the circle 55. The use of the two pairs of Hall sensors (the first lateral sensor 40a paired with the second lateral sensor 45a; the first lateral sensor 40c paired with the second lateral sensor 45c) makes it possible to measure the field gradient of the magnetic interference field. The third lateral Hall sensor 47 measures the magnetic background field $B_{off}$.

Figure 8:
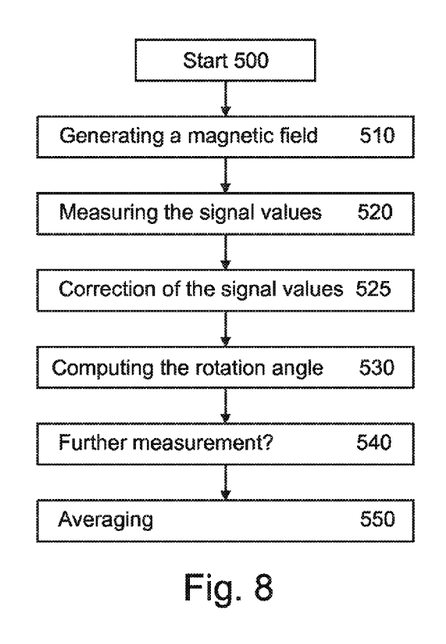
FIG. 8 shows flow chart of the method.

FIG. 8 shows a simplified representation of the method according to this description. The method for the contactless measurement of a rotation angle 15 starts at step 500. In step 510, a magnetic field is generated by the permanent magnet 60. The signal values $V_{S1}$, $V_{S2}$ and $V_{S3}$ are captured by the first lateral Hall sensors 40a-40c and possibly by the second lateral Hall sensors 45a-45c and possibly by the third lateral Hall sensor 47 in step 520. In step 525, the signal values $V_{S1}$, $V_{S2}$ and $V_{S3}$ are corrected, in order to compensate the influence of the interfering fields in the vicinity of the apparatus 10. In step 530, the rotation angle 15 is calculated, and, in step 540, it is checked whether a different combination of the signal values $V_{S1}$, $V_{S2}$ and $V_{S3}$ is possible for the computation of the rotation angle 15. If this is the case, these further combinations are calculated. In step 550, the rotation angle 15 is calculated by average determination from the calculation in step 530.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

LIST OF REFERENCE NUMBERS 10 apparatus
15 rotation angle
30 chip plane
35 semiconductor substrate
40a-c first lateral Hall sensors
45a-c second lateral Hall sensors
47 third lateral Hall sensor
50 circular path
55 center of circle
60 permanent magnet
65 axle
70 rotation axis
75 interfering conductor
80 lines
90 signal processor

The invention claimed is:

1. An apparatus for the contactless measurement of a rotation angle comprising:
a permanent magnet having a number of poles, wherein the number of poles amounts to four or more and cannot be divided by three;
at least three first lateral Hall sensors arranged equiangular in a circular path in a plane below the permanent magnet; and
at least two second lateral Hall sensors, wherein two of the at least two second lateral Hall sensors are arranged respectively opposite one of the first lateral Hall sensors in the circular path.

2. The apparatus according to claim 1, further comprising a third lateral Hall sensor arranged in a center of the circle within the circular path.

3. The apparatus according to claim 1, wherein the permanent magnet is arranged rotatably above the plane of the circular path.

4. The apparatus according to claim 3, wherein the permanent magnet is rotatable about a rotation axle disposed perpendicularly to the plane, and the rotation axle extends through the center of the circle.

5. The apparatus according to claim 1, wherein the permanent magnet has two poles.

6. A method for the contactless measurement of a rotation angle comprising:
generating a magnetic field (B) below the rotation angle to be measured with a permanent magnet having an even number of poles, wherein the number of the poles amounts to four or more and cannot be divided by three;
measuring signal values ($V_{S1}$, $V_{S2}$, $V_{S3}$) in at least three first lateral Hall sensors arranged in a circular path and pervaded by the magnetic field (B);
calculating the rotation angle by an apparatus according to the following equation:

$$\Phi = \operatorname{atan}\left(\frac{v_{S_a} - v_{S_2}}{\sqrt{3v_{S_1}}}\right),$$

wherein φ=magnetic angle and $V_{S1,\,2,\,3}$=Voltages in the at least three first lateral Hall sensors.

7. The method according to claim 6, wherein the calculation is executed several times, and an average value is determined for the rotation angle from results of the execution of the calculation.

8. The method according to claim 6, further comprising:
correction of the signal values ($V_{S1}$, $V_{S2}$, $V_{S3}$) using interfering factors, wherein the interfering factors comprise at least one of background fields and field gradients.

* * * * *